(12) United States Patent
Bahta et al.

(10) Patent No.: US 9,641,993 B2
(45) Date of Patent: May 2, 2017

(54) ACCESS CLASS BARRING AND REDIRECTING OF EMERGENCY CALLS

(71) Applicant: Verizon Patent and Licensing Inc., Arlington, VA (US)

(72) Inventors: Jonathan Daniel Bahta, Richardson, TX (US); Timothy Vogel, Irving, TX (US); Toby Varughese John, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/754,752

(22) Filed: Jun. 30, 2015

(65) Prior Publication Data
US 2017/0006447 A1 Jan. 5, 2017

(51) Int. Cl.
*H04M 11/04* (2006.01)
*H04W 4/22* (2009.01)
*H04W 48/16* (2009.01)

(52) U.S. Cl.
CPC .............. *H04W 4/22* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 2010/0304749 A1* | 12/2010 | Dwyer | H04W 36/0061 455/443 |
| 2013/0109391 A1* | 5/2013 | Lee | H04W 48/12 455/436 |
| 2014/0011501 A1* | 1/2014 | Mikami | H04W 36/30 455/437 |
| 2014/0018075 A1* | 1/2014 | Verger | H04W 48/18 455/436 |
| 2014/0242996 A1* | 8/2014 | Nakamura | H04W 36/38 455/436 |
| 2016/0095046 A1* | 3/2016 | Tervonen | H04W 48/14 370/338 |
| 2016/0127970 A1* | 5/2016 | Chuang | H04W 48/12 455/436 |

* cited by examiner

*Primary Examiner* — German J Viana Di Prisco

(57) ABSTRACT

A method, a device, and a non-transitory storage medium having instructions to store a first access class barring parameter and a second access class barring parameter pertaining to emergency calls via a cell on which a wireless device is camped; receive an indication that an emergency call is to be established; select one or more values of the second barring parameter in response to a determination that a value of the first barring parameter indicates that the emergency call cannot be established via the cell; select a first candidate cell based on the one or more values of the second barring parameter; and determine whether the emergency call can be established via the first candidate cell based on the one or more values of the second barring parameter and system information pertaining to the first candidate cell.

20 Claims, 16 Drawing Sheets

ACCESS CLASS BARRING AND REDIRECTING OF EMERGENCY CALLS

BACKGROUND

In a Long Term Evolution (LTE) network, when congestion reaches a threshold level, the LTE network may invoke access class barring (ACB) to protect the LTE network from failure or shutdown, as well as to provide priority to certain user equipments (UEs) based on the access class of the UEs. For example, access class barring may provide a priority to emergency voice calls (e.g., E911). The LTE network uses System Information Block (SIB) Type 2 messages to carry access class barring parameters.

DETAILED DESCRIPTION OF PREFERRED EMBODIMENTS

Figure 1:
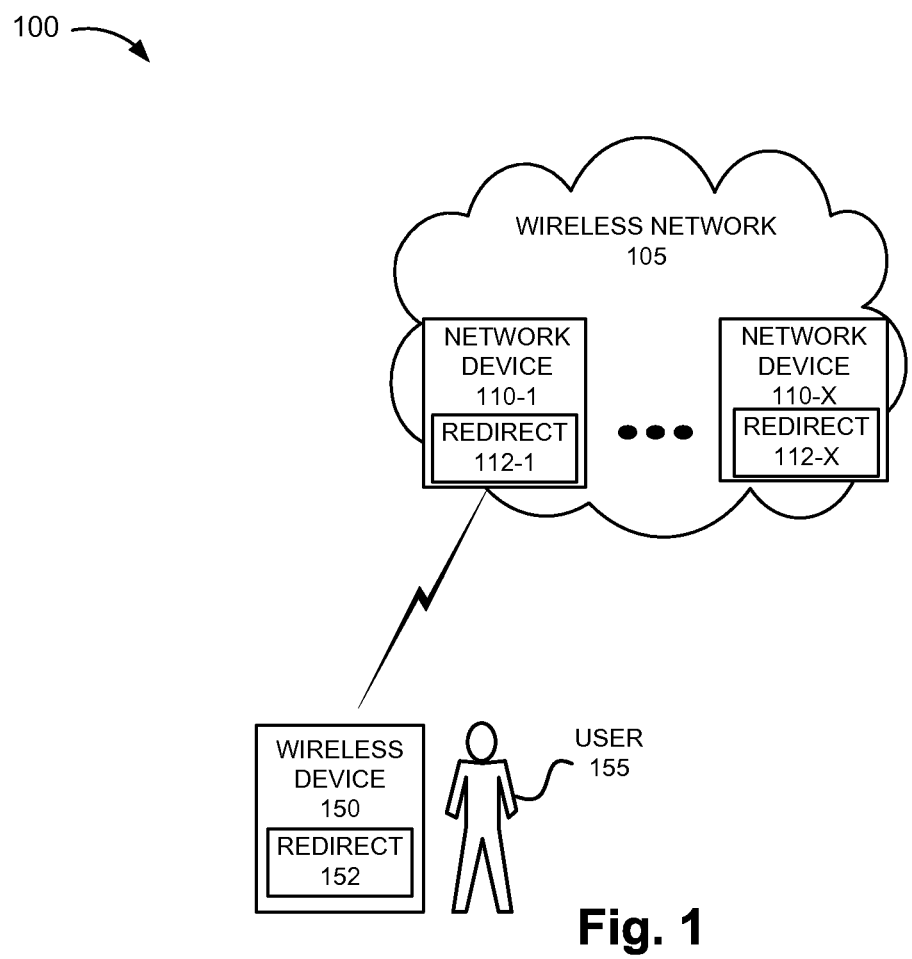
FIG. 1 is a diagram illustrating an exemplary environment in which exemplary embodiments of access class barring and redirecting may be implemented.

The following detailed description refers to the accompanying drawings. The same reference numbers in different drawings may identify the same or similar elements. Also, the following detailed description does not limit the invention.

Current access class barring procedures in various Third Generation Partnership Project (3GPP) specifications (e.g., Technical Specification (TS) 36.331 version 12.4.1 and TS 36.304 version 12.3.1) specify access control mechanisms pertaining to access class ten (10), which pertains to whether or not network access for emergency calls (e.g., 911) is allowed for UEs with access classes 0 to 9 or without an International Mobile Subscriber Identity (IMSI). For example, in section 5.3.3.2 of the TS 36.331 version 12.4.1, the specification indicates that the UE will not initiate an emergency call when an ac-BarringForEmergency parameter is set to True. However, the specifications fail to set forth an alternate system for the UE to search and originate the emergency call when the ac-BarringForEmergency parameter is set to True.

According to an exemplary embodiment, the emergency call is defined as a telephone call. According to an exemplary implementation, the emergency telephone number is 911. However, according to other exemplary implementations, other emergency telephone numbers (e.g., 112, 118, 999, etc.) may be implemented depending on the geographic region.

According to an exemplary embodiment, a redirecting procedure is described in which an access class barring parameter (hereinafter referred to as a "redirection parameter") aids the UE in establishing the emergency call when ac-BarringForEmergency is set to True. According to an exemplary embodiment, the redirection parameter is carried by a SIB Type 2 message. According to an exemplary embodiment, as described further below, the wireless device (e.g., a UE) uses the redirection parameter prior to an initiation of a radio resource connection (RRC) procedure pertaining to the emergency call, and when ac-BarringForEmergency parameter is set to True. In this way, the UE uses the redirection parameter to "redirect" the UE from the barred cell to another candidate cell via which the UE may establish the emergency call.

According to an exemplary embodiment, the redirection parameter indicates a frequency channel number as an attribute of a candidate cell, along with a value. According to an exemplary implementation, the frequency channel number is indicated by an Evolved Absolute Radio Frequency Channel Number (EARFCN). For example, the EARFCN pertains to a downlink frequency channel number of the candidate cell. According to another exemplary implementation, the redirection parameter indicates a carrier frequency as an attribute of a candidate cell. For example, the carrier frequency indicates a downlink carrier frequency (e.g., in Megahertz (MHz)). In this way, a calculation of the carrier frequency based on the EARFCN may be avoided. According to other implementations, the EARFCN may indicate both the downlink and the uplink frequency channel numbers of the candidate cell. Similarly, according to other implementations, the carrier frequency may indicate both the downlink and the uplink carrier frequencies of the candidate cell.

According to an exemplary embodiment, the redirection parameter indicates a cell identifier as an attribute of the candidate cell, along with a value. According to an exemplary implementation, the cell is indicated by a physical cell identifier (PCI). According to another exemplary implementation, the cell is indicated by an evolved Universal Mobile Telecommunications System (UMTS) Terrestrial Radio Access Network (E-UTRAN) cell identity (ECI).

According to an exemplary embodiment, the redirection parameter indicates a wireless node identifier as an attribute of the candidate cell, along with a value. According to an exemplary implementation, the wireless node is indicated by an ECI, which includes an evolved Node B (eNB) identifier. Depending on the network configuration, the eNB identifier indicates an eNB that is different from the eNB from which the ac-BarringForEmergency parameter=True was received. Alternatively, the eNB identifier indicates the eNB that is same as the eNB from which the ac-BarringForEmergency parameter=True was received. For example, the eNB may service multiple cells. Additionally, the eNB may operate at different carrier frequencies between these cells. In some cases, different cells serviced by the same eNB may be in a different access class barring state.

According to an exemplary embodiment, the redirection parameter indicates a priority for selecting a candidate cell among multiple candidate cells. According to an exemplary implementation, the priority is indicated by a priority flag. For example, the redirection parameter may indicate a single attribute (e.g., frequency channel number, etc) pertaining to candidate cells (e.g., a list) along with priority flags. According to another example, the redirection parameter may indicate multiple attributes (e.g., frequency channel number and PCI, etc.) pertaining to candidate cells along with priority flags. By virtue of the priority flag associated with each candidate cell, the UE can select, search and/or attempt to establish the emergency call via the candidate cell based on the order or priority indicated by the priority flag.

According to various embodiments, the redirection parameter may include various combinations of attributes of the candidate cell, as described herein. Additionally, or alternatively, the redirection parameter may include other types of identifiers that may assist the UE in selecting a candidate cell, such as a tracking area code, etc. However, given the various attributes available, other considerations pertaining to the redirection parameter include the number of bits needed to convey a particular attribute of the candidate cell. Further, time considerations (e.g. when the particular attribute is obtained from the candidate cell for comparison) may be considered. For example, the PCI of a candidate cell may be obtained by the UE, and from the candidate cell, before the ECI of the candidate cell, by virtue of a cell synchronization procedure being performed by the UE before reading SIB messages from the candidate cell.

According to an exemplary embodiment, the redirection parameter is carried in a SIB Type 2 message of a cell only when access class barring for an emergency call is invoked or active (e.g., ac-BarringForEmergency=True) and not when access class barring for the emergency call is not invoked or not active (e.g., ac-BarringForEmergency=False). According to other exemplary embodiments, the redirection parameter is carried in the SIB Type 2 message regardless of the value of the ac-BarringForEmergency parameter.

According to an exemplary embodiment, a wireless node stores redirection parameter information. According to an exemplary implementation, with respect to an LTE network, an eNB stores a database, a table, or other suitable data structure (e.g., an array, a linked list, etc.) that includes the redirection parameter information. According to such an implementation, the eNB can generate and transmit SIB Type 2 messages that carry the redirection parameter, in addition to existing access class barring information (e.g., ac-BarringForEmergency=True or False). The database or the data structure may be configured by a network administrator.

According to an exemplary embodiment, the wireless node includes a redirection component. The redirection component provides an access class barring and redirecting service, as described herein. According to an exemplary implementation, the redirection component selects the redirection parameter information stored in the database or the data structure to be used to generate the SIB Type 2 message only when access class barring for emergency calls is invoked with respect to a cell. For example, the redirection component determines or is triggered by another component (e.g., congestion control logic) of the wireless node when access class barring for emergency calls is invoked. According to another exemplary implementation, the redirection component selects the redirection parameter information to be used to generate the SIB Type 2 message regardless of whether access class barring for emergency calls is invoked with respect to a cell.

According to an exemplary embodiment, a user device includes a redirection component. The redirection component provides an access class barring and redirecting service, as described herein. According to an exemplary implementation, the redirection component stores the redirection parameter and provides various functions, as described herein, when access class barring for emergency calls is indicated with respect to a cell.

FIG. 1 is a diagram illustrating an exemplary environment 100 in which exemplary embodiments of access class barring and redirecting may be implemented. As illustrated, environment 100 includes a wireless network 105. Wireless network 105 includes network devices 110-1 through 110-X, in which X>1 (also referred to collectively as network devices 110 and generally or individually as network device 110). As further illustrated, environment 100 includes a wireless device 150. Wireless device 150 may be operated by a user 155.

Environment 100 may be implemented to include wireless connections between wireless devices 150 and wireless network 105. A connection may be direct or indirect and may involve an intermediary device and/or an intermediary network not illustrated in FIG. 1. For example, the connection between wireless device 150 and network device 110 may be indirect and involve other types of wireless nodes, such as a home eNB, a pico base station, a femto device, etc. Additionally, the number and the arrangement of the connection between wireless device 150 and network device 110 are exemplary.

Wireless network 105 includes one or multiple wireless networks of one or multiple types. For example, wireless network 105 may include an LTE network, an LTE Advanced network, or a future generation wireless network architecture. Additionally, although an embodiment of access class barring and redirecting is described in relation to an LTE network, the principles described herein may be implemented in other wireless networks, such as, for example, a UMTS network, a Global System for Mobile Communications (GSM) network, a Wideband Code Division Multiple Access (WCDMA) network, an Ultra Mobile Broadband (UMB) network, a High-Speed Packet Access (HSPA) network, an Evolution Data Optimized (EV-DO) network, and/or another type of wireless network. For example, a system information block message or other type of network message may be used to carry the redirection parameter and end devices may use the redirection parameter to be redirected to a candidate cell when end devices are barred from establishing emergency calls via a current cell of the wireless network.

Network device 110 includes a wireless communicative device. For example, network device 110 may be implemented as an eNB or other form of a wireless node (e.g., a base station). As illustrated, network devices 110-1 through 110-X include, respectively, a redirection component 112-1 through 112-X (also referred to collectively as redirection components 112 and generally or individually as redirection component 112). Redirection component 112 provides an access class barring and redirecting service, as described herein.

Wireless device 150 includes a wireless communicative device. Wireless device 150 may be a mobile device or portable device. For example, wireless device 150 may be implemented as a smartphone, a tablet device, a netbook, a vehicular communication system within a vehicle, a computer, a wearable device (e.g., a watch, etc.), or another type of mobile device or portable device. Alternatively, wireless device 150 may be a non-mobile (e.g., stationary) device. For example, wireless device 150 may be implemented as an wireless electronic kiosk or a wireless telephone booth. According to an exemplary embodiment, wireless device 150 includes a redirection component 152. Redirection component 152 provides an access class barring and redirecting service, as described herein.

Figure 2A:
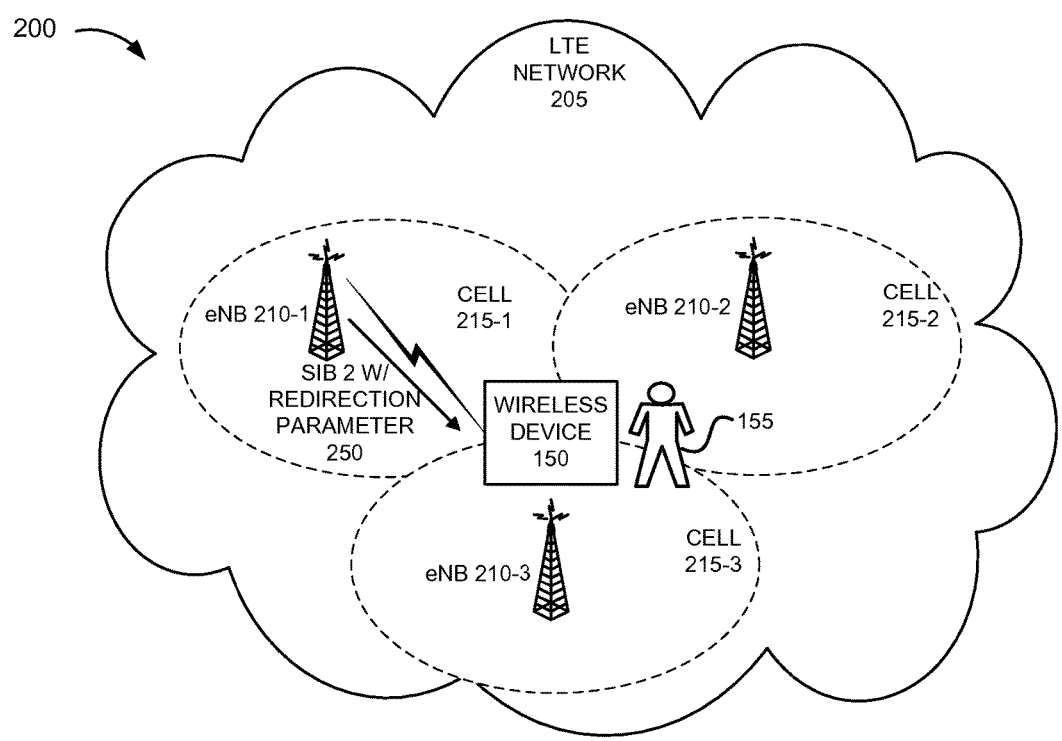
FIGS. 2A-2D are diagrams that illustrate an exemplary process pertaining to access class barring and redirecting.

An exemplary embodiment of access class barring and redirecting is described further below in relation to FIGS. 2A-2D. FIG. 2A illustrates an exemplary environment 200 in which an exemplary embodiment of access class barring and redirecting may be implemented. As illustrated, environment 200 includes an LTE network 205, which is an exemplary implementation of wireless network 105. LTE network 205 includes eNBs 210-1, 210-2, and 210-3 (also referred to collectively as eNBs 210 and generally or individually as eNB 210), which are an exemplary implementation of network devices 110. As illustrated, eNB 210-1 services a cell 215-1, eNB 210-2 services a cell 215-2, and eNB 210-3 services a cell 215-3. The number of eNBs 210 and cells 215 illustrated are exemplary. Additionally, according to other implementations, a single eNB 210 may service more than cell 215.

It may be assumed, although not illustrated, that other network elements (e.g., a packet data network gateway (PGW), a serving gateway (SGW), a mobility management entity (MME), etc.) exist in LTE network 205, but have been omitted for purposes of brevity.

Referring to FIG. 2A, according to an exemplary scenario, assume user 155 operates wireless device 150, and that wireless device 150 is attached to and registered with LTE network 205 via eNB 210-1. According to an exemplary implementation, wireless device 150 may also register with an Internet Protocol Multimedia Subsystem (IMS) network (not illustrated). For example, wireless device 150 may perform a Proxy-Call Session Control Function (P-CSCF) discovery and registration process.

ENB 210-1 (periodically) transmits SIB Type 2 messages. Illustrated in FIG. 2A as SIB 2 w/redirection parameter 250, the SIB Type 2 message carries a redirection parameter, as described herein. In accordance with a 3GPP standard for an LTE network, wireless device 150 periodically listens to the SIB Type 2 message based on a schedule obtained from a SIB Type 1 message (not illustrated). Thereafter, assume user 155 initiates a session. For example, user 155 may open a voice application on wireless device 150 and dial 911. In response to the input of user 155, redirection component of wireless device 150 reads the most-recently received SIB Type 2 message. According to this example, assume that the SIB Type 2 message indicates that ac-BarringForEmergency is set to True. Additionally, the SIB Type 2 message carries a redirection parameter. Provided below are examples of the redirection parameter.

According to an exemplary implementation, the access class barring parameters, which include the redirection parameter may be implemented as follows:

ac-BarringInfo ac-BarringForEmergency TRUE ac-BarringForEmergency EARFCN 5230     (1)

As illustrated in example (1) above, ac-BarringInfo may be considered a header for access class barring information for emergency calls. The ac-BarringForEmergency listed first under the header is a first parameter in which the value indicates whether access class barring for emergency calls is active or not based on a particular value (e.g., True or False). The ac-BarringForEmergency listed second under the header is a second parameter (i.e., the redirection parameter) in which the value indicates one or multiple attributes pertaining to one or multiple candidate cells and corresponding value(s) of the attribute(s). In this example, the redirection parameter specifies EARFCN as an attribute of a candidate cell, and its corresponding value of 5230. The number 5230 is purely exemplary and, in this example, the EARFCN pertains to the downlink of a candidate cell. In 3GPP TS 36.101, a formula ($F_{DL}=F_{DL\_LOW}+0.1\ (N_{DL}-N_{OFFS-DL})$) is set forth to calculate the carrier frequency for the downlink based on the value of the EARFCN, along with tables of information for $F_{DL\_LOW}$, $N_{DL}$, and $N_{OFFS-DL}$. According to an exemplary embodiment, redirection component 152 of wireless device 150 calculates the carrier frequency for the downlink based on the value of EARFCN. As an example, referring back to FIG. 2A, the carrier frequency may pertain to cell 215-2 of eNB 201-2 or cell 215-3 of eNB 210-3. According to other exemplary implementations, the redirection parameter also specifies an uplink frequency channel number, in which a similar formula is used (e.g., $F_{UL}=F_{UL\_LOW}+0.1\ (N_{UL}-N_{OFFS-UL})$) to calculate the carrier frequency for the uplink of the candidate cell.

According to another exemplary implementation, the access class barring parameters, which include the redirection parameter may be implemented as follows:

ac-BarringInfo ac-BarringForEmergency TRUE ac-BarringForEmergency EARFCN-PCI 5230 4     (2)

As illustrated in example (2) above, the redirection parameter specifies EARFCN 5230. Additionally, in contrast to example (1) above, the redirection parameter includes a PCI as an attribute along with a value (i.e., PCI 4). The number 4 is purely exemplary. According to this example, referring back to FIG. 2A, cell 215-2 or cell 215-3 may have a PCI value of 4. Wireless device 150 may determine the PCI of neighboring eNBs 210 based on primary and secondary synchronization signals, etc., as specified in the LTE standard for cell synchronization.

While cell synchronization is typically performed, by a UE wanting to camp on a cell, before obtaining a Master Information Block message or a SIB message of a cell, according to other exemplary implementations, the redirection parameter includes a cell identity (CID), as follows:

ac-BarringInfo ac-BarringForEmergency TRUE ac-BarringForEmergency EARFCN-CID 5230 26     (3)

in which, as illustrated in example (3) above, the EARFCN has a value of 5230 and the CID has a value of 26; or ac-BarringInfo ac-BarringForEmergency TRUE ac-BarringForEmergency EARFCN-PCI-CID 5230 4 26     (4)

in which, as illustrated in example (4) above, the EARFCN has a value of 5230, the PCI has a value of 4, and the CID has a value of 26.

In LTE network 205, wireless device 150 obtains the cell identity in a SIB Type 1 message that carries the ECI. According to other implementations, the redirection parameter includes an eNB identifier, which is also included in the ECI of the SIB Type 1 message, as follows:

ac-BarringInfo ac-BarringForEmergency TRUE ac-BarringForEmergency EARFCN-eNB 5230 42    (5)

in which, as illustrated in example (5) above, the EARFCN has a value of 5230, and the eNB identifier (eNB) has a value of 42. Additionally, the SIB Type 1 message includes a cell frequency band indicator.

According to yet another exemplary implementation, the redirection parameter includes a priority. For example, the list may include multiple entries pertaining to an LTE carrier frequency or a frequency channel number, as well as a cell identity and/or a wireless node identifier, etc. By way of further example, the redirection parameter may be implemented as follows:

ac-BarringInfo ac-BarringForEmergency TRUE ac-BarringForEmergency EARFCN-PCI 5230 41;
  1350 23 2    (6)

in which, as illustrated in example (6) above, the EARFCN has a value of 5230, the PCI has a value of 4, and the priority flag has a value of 1; and the EARFCN has a value of 1350, the PCI has a value of 23, and the priority flag has a value of 2.

According to the example above, the redirection parameter includes two groupings of EARFCN-PCIs (5230 4; 1350 23), along with priority flag values of 1 and 2, which indicate a priority or an ordering for wireless device 150 to search and potentially establish the emergency call. If multiple groupings exist with the same priority flag value, wireless device 150 may randomly select one of the groups from the list over another group(s).

Referring back to FIG. 2A, according to an exemplary scenario, assume that the access class barring parameter carried by SIB 2/w redirection parameter 250 corresponds to number (2), in which the redirection parameter includes ac-BarringForEmergency EARFCN-PCI 5230 4.

Figure 2B:
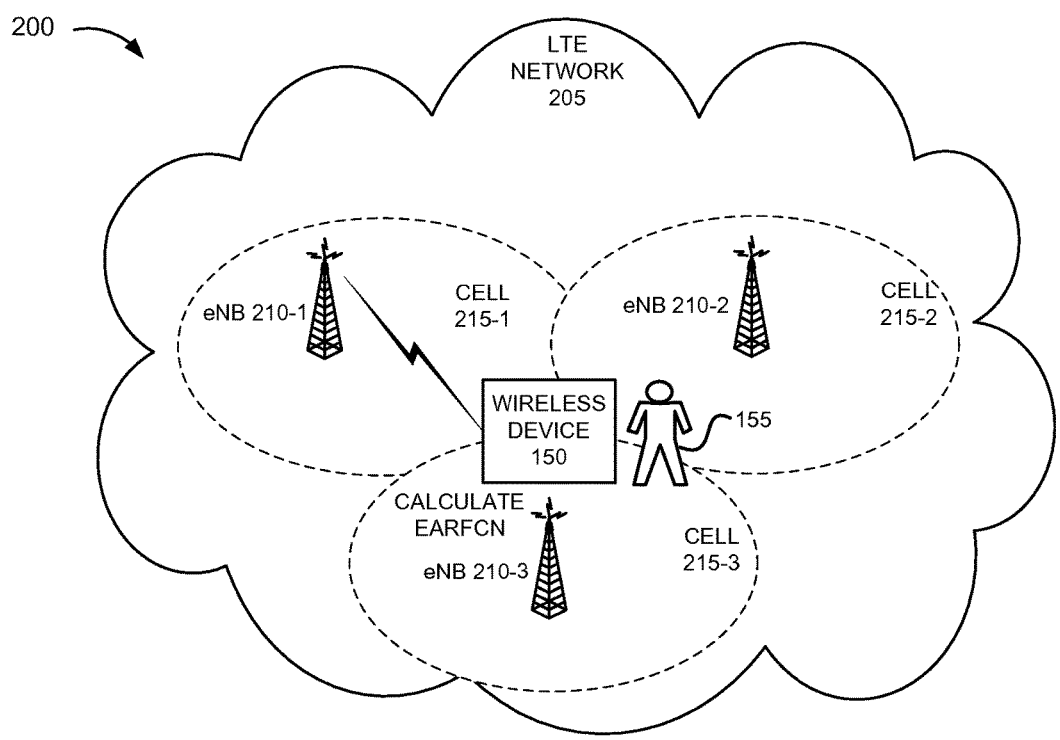
Figure 2C:
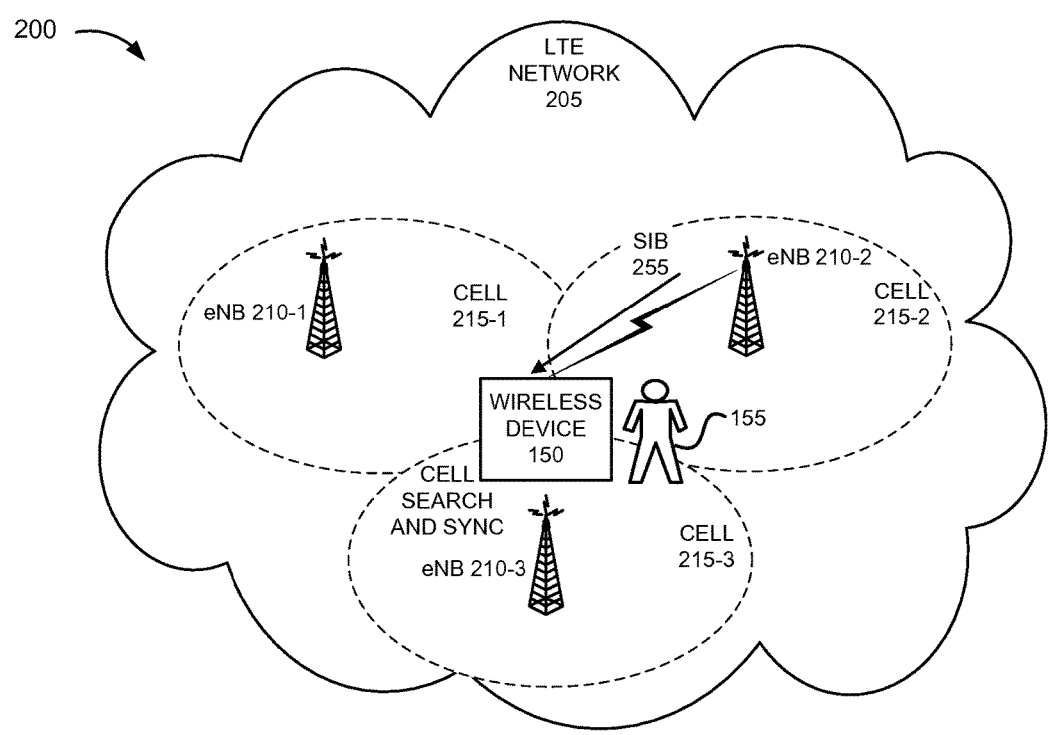

Referring to FIG. 2B, redirection component 152 (not shown) of wireless device 150 calculates the carrier frequency of the downlink based on the attribute and value (i.e., EARFCN 5230) of the candidate cell. Referring to FIG. 2C, wireless device 150 begins a cell search and synchronization procedure based on the calculated, downlink carrier frequency and the PCI value, which for this example, pertain to cell 215-2 serviced by eNB 210-2. Thereafter, wireless device 150 receives SIB messages (e.g., SIB Type 1, etc.) including a SIB Type 2 (illustrated as SIB 255). Redirection component 152 of wireless device 150 compares the PCI value of 4 to information obtained from the received SIB messages to determine whether the correct candidate cell has been selected. For purposes of this example, assume that the values of the redirection parameter match the attributes of cell 215-2. Additionally, according to this example, redirection component 152 determines that the SIB Type 2 message indicates that the first ac-BarringForEmergency parameter is set to FALSE. Thus, wireless device 150 is permitted to establish the emergency call via cell 215-2.

Figure 2D:
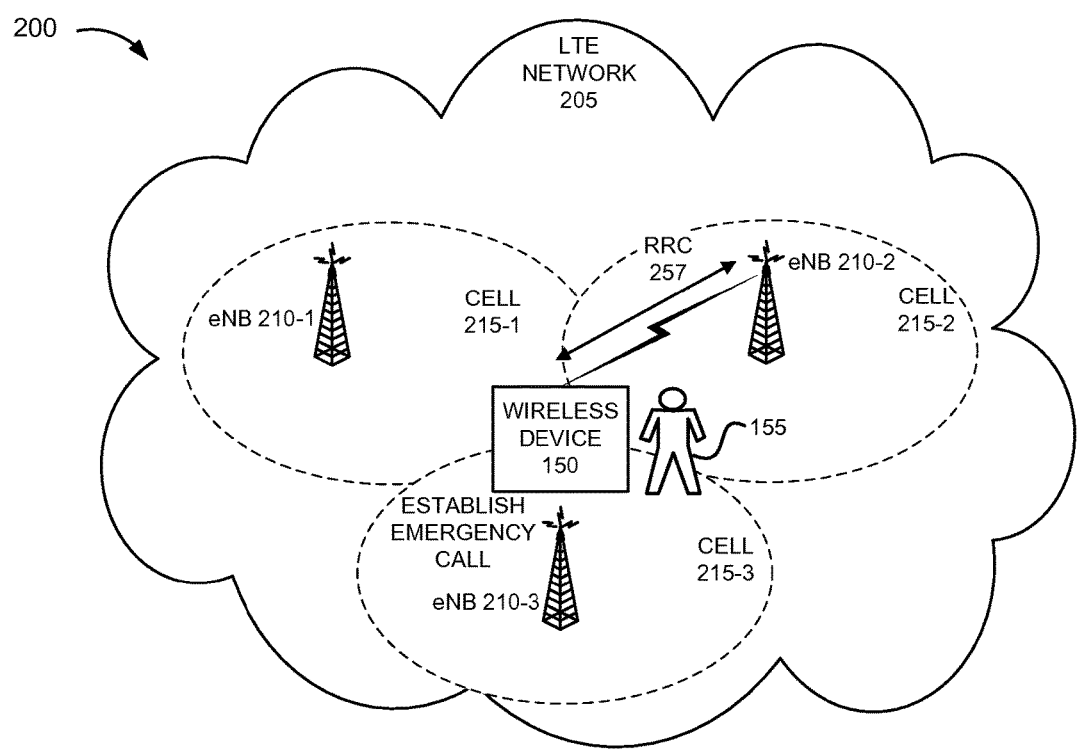

Referring to FIG. 2D, based on these conditions, wireless device 150 initiates a radio resource connection (RRC) procedure (illustrated as RRC 257). According to this example, the RRC procedure is successful, and wireless device 150 establishes the emergency call in cell 215-2 via eNB 210-2.

Figure 2E:
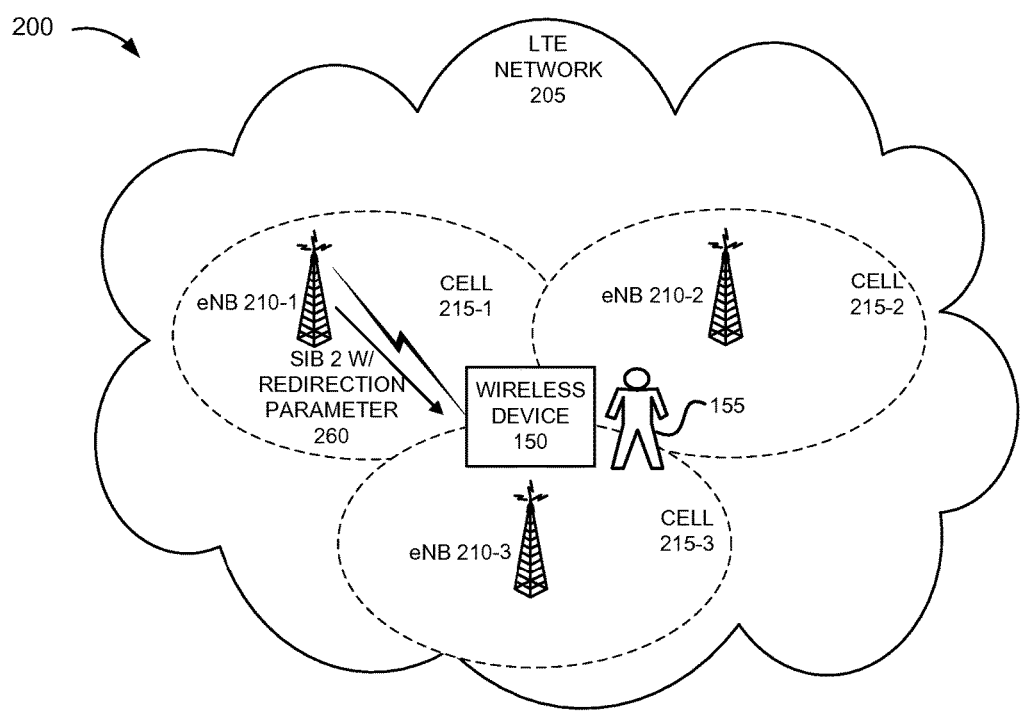
FIGS. 2E-2I are diagrams that illustrate another exemplary process pertaining to access class barring and redirecting.

Another exemplary embodiment of access class barring and redirecting is described further below in relation to FIGS. 2E-2I. Referring to FIG. 2E, assume a similar scenario as previously described in relation to FIG. 2A. Illustrated in FIG. 2E as SIB 2 w/redirection parameter 260, the SIB Type 2 message carries the redirection parameter However, according to this scenario, assume that the redirection parameter includes ac-barringForEmergency EARFCN-PCI 5230 4 1 1350 23 2. That is, there are a series of candidate cell attributes (e.g., EARFCN and PCI) and values, along with priority flags (e.g., having values of 1 and 2).

Figure 2F:
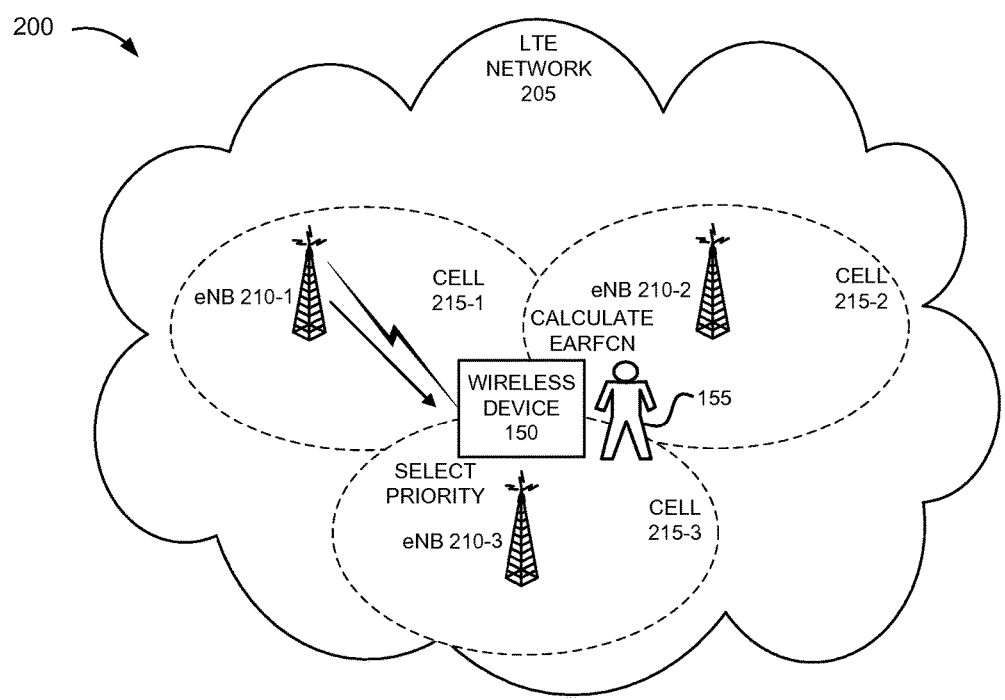
Figure 2G:
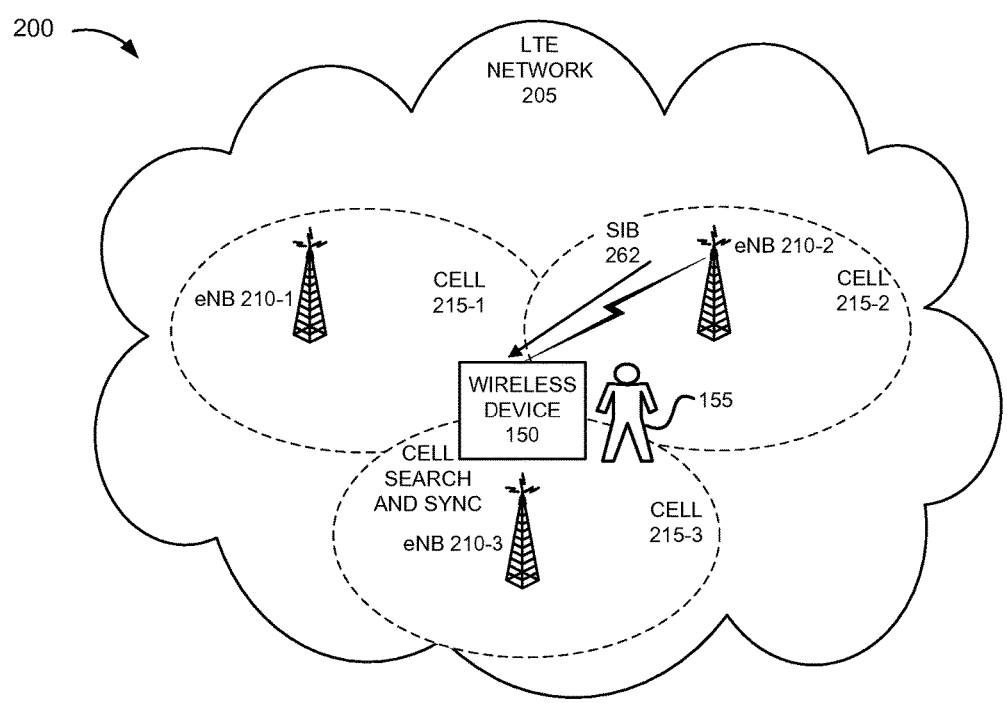

Referring to FIG. 2F, redirection component 152 of wireless device 150 selects the highest priority in the groupings (e.g., EARFCN-PCI 5230 4) based on priority flag value of 1. Subsequently, redirection component 152 calculates the downlink carrier frequency based on the value of the EARFCN attribute. Referring to FIG. 2G, wireless device 150 begins a cell search and synchronization procedure based on the calculated, downlink carrier frequency and the value of the PCI, which for this example, pertains to cell 215-2 serviced by eNB 210-2. Thereafter, wireless device 150 receives SIB messages including a SIB Type 2 (illustrated as SIB 262). Redirection component 152 of wireless device 150 compares the PCI value of 4 to information obtained from the received SIB messages to determine whether the correct candidate cell has been selected.

According to this example, while redirection component 152 determines that cell 215-2 matches the attributes of the candidate cell specified in the redirection parameter, the SIB Type 2 message indicates that the first ac-BarringForEmergency parameter set to TRUE. In response to this condition, an RRC layer of wireless device 150 informs the non-access stratum (NAS) layer about the failure of the RRC procedure and/or that the cell is barred, as specified in the 3GPP standard.

Additionally, wireless device 150 may receive an additional redirection parameter, which is carried by SIB 262, from eNB 210-2. Redirection component 152 stores the redirection parameter from eNB 210-2. According to an exemplary embodiment, redirection component 152 includes logic to sort or prioritize redirection parameters originating from different eNBs 210, as well as redirection parameters originating from different cells belonging to a same eNB 210. For example, redirection component 152 may use the value of a priority flag, when present, to prioritize redirection parameters. Additionally, or alternatively, when the additional redirection parameters match an ordering of redirection parameters already stored, redirection component 152 may discard the overlapping redirection parameter information obtained.

Figure 2H:
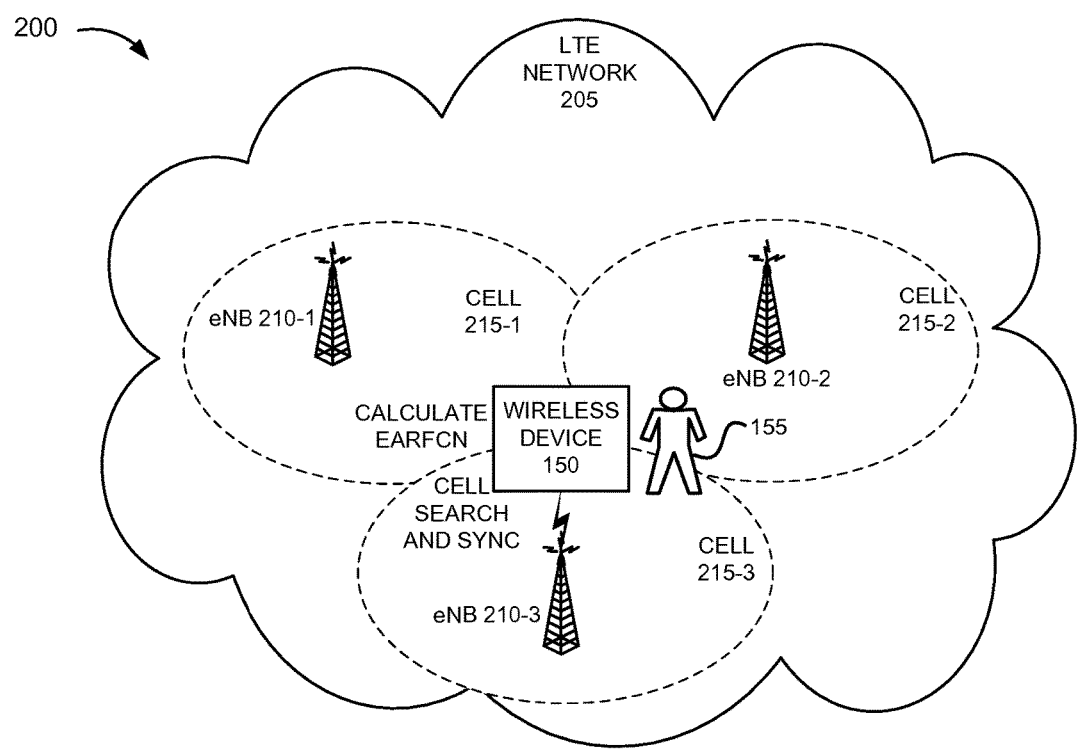

Referring to FIG. 2H, redirection component 152 of wireless device 150 selects the next highest priority in the groupings (e.g., EARFCN-PCI 1350 23) based on priority flag value of 2. Subsequently, redirection component 152 calculates the downlink carrier frequency based on the EARFCN parameter value. Thereafter, wireless device 150 begins another cell search and synchronization procedure based on the calculated, downlink carrier frequency and the value of the PCI, which for this example, pertains to cell 215-3 service by eNB 210-3.

Figure 2I:
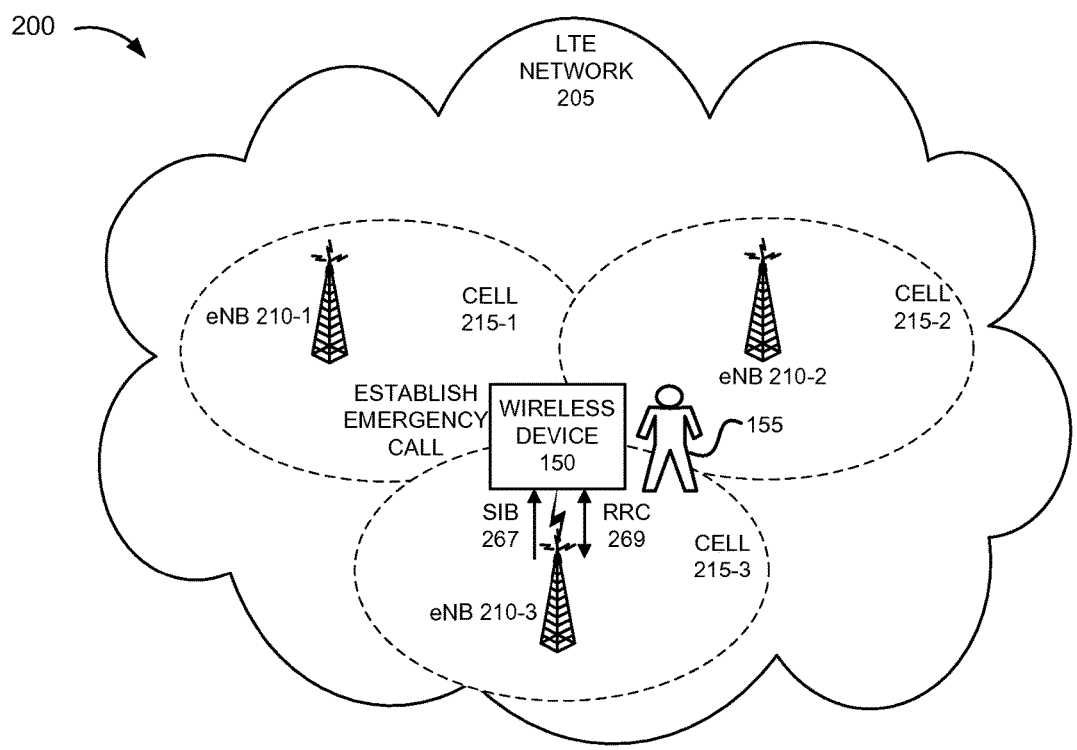

Referring to FIG. 2I, wireless device 150 receives SIB messages including a SIB Type 2 (illustrated as SIB 267). Redirection component 152 of wireless device 150 compares the redirection parameter (e.g., the PCI value of 23) to information obtained from the received SIB messages to determine whether the correct cell has been selected. For purposes of this example, assume that the values of the redirection parameter match the attributes of cell 215-3. Additionally, in this case, the SIB Type 2 message indicates that the first ac-BarringForEmergency parameter set to FALSE. In response, wireless device 150 initiates a radio resource connection (RRC) procedure (illustrated as RRC 269). In this example, the RRC procedure is successful, and wireless device 150 establishes an emergency call.

Although FIGS. 2A-2I illustrate exemplary steps and messaging, according to other implementations, depending on the type of wireless network, wireless conditions, etc., alterations to the steps and/or messaging may be performed.

Figure 5:
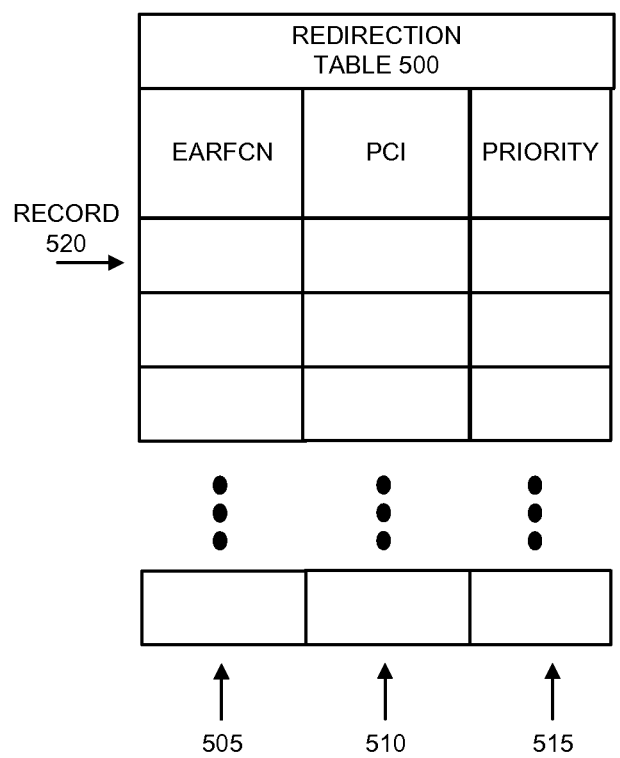
FIG. 5 is a diagram illustrating an exemplary table used to provide a redirecting service.

As previously described, according to an exemplary embodiment, the wireless node stores redirection parameter information. For example, eNB 210 may store a redirection table 500, as illustrated in FIG. 5. Redirection table 500 stores redirection parameter information.

Referring to FIG. 5, redirection table 500 includes an EARFCN field 505, a PCI field 510, and a priority field 515. The fields illustrated in FIG. 5 and described herein are exemplary. According to other implementations, redirection table 500 may store additional, fewer, and/or different instances of data. For example, according to other exemplary implementations, redirection table 500 may not include PCI field 510 or priority field 515. Additionally, or alternatively, identifiers (e.g., a carrier frequency, an eNB identifier, etc.) other than, or in addition to EARFCN and PCI, may be implemented. Additionally, or alternatively, redirection table 500 may include a congestion field. For example, depending on other cells that are congested relative to the barred cell, different redirection parameters may be transmitted to wireless device 150. In this regard, congestion field includes data that indicates an access class barring signature. Depending on the current access class barring signature of the wireless node (e.g., eNB 210), a corresponding redirection parameter may be mapped to such signature.

Figure 6:
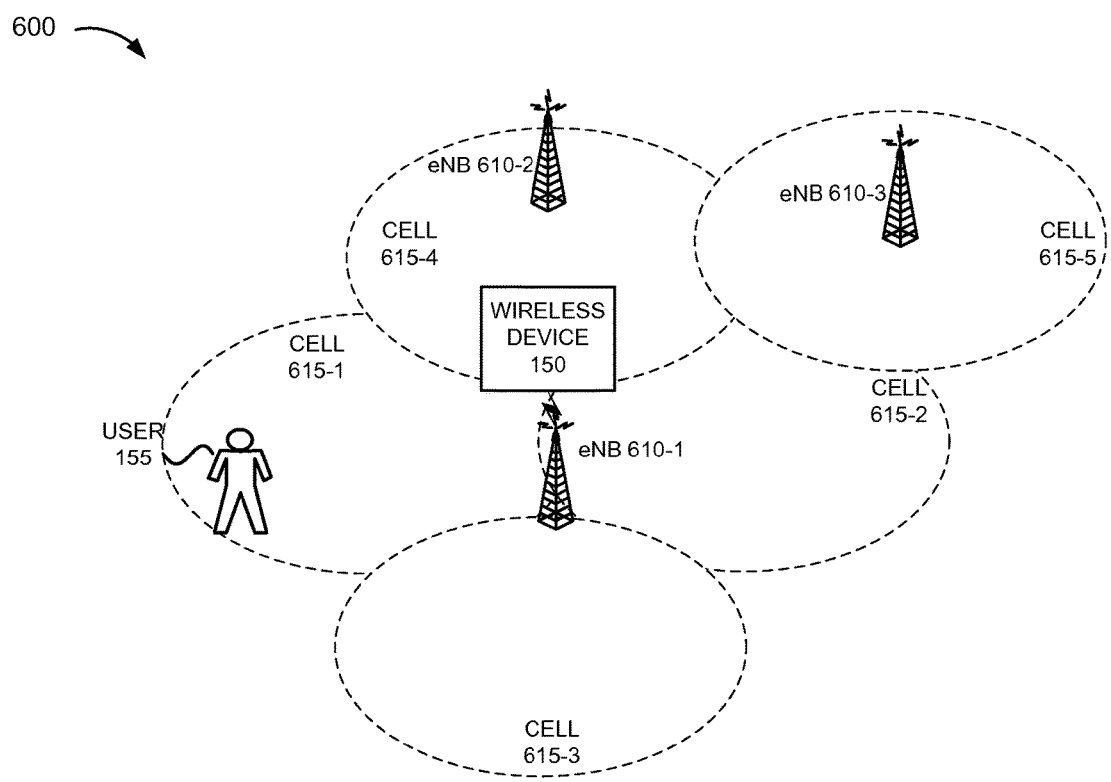
FIG. 6 is a diagram illustrating yet another exemplary environment in which exemplary embodiments of access class barring and redirecting may be implemented.

Referring to FIG. 6, an exemplary environment 600 is illustrated that includes eNBs 610-1 through 610-3 (also referred to as eNBs 610 or generally or individually as eNB 610), as well as cells 615-1 through 615-5 (also referred to as cells 615 or generally or individually as cell 615). According to the principle described above, the redirection parameter transmitted by eNB 610-1 to wireless device 150 may be different when cells 615-1 and 615-2 are barred for emergency calls, compared to when cells 615-1 and 615-3 are barred for emergency calls. According to an exemplary scenario, when wireless device 150 is camped on cell 615-1 and the SIB Type 2 message indicates emergency call barring, the redirection parameter would exclude listing cell 615-2 as a candidate cell when cell 615-2 is also barred. However, when cells 615-1 and 615-3 are barred for emergency calls, the redirection parameter of the SIB Type 2 message includes cell 615-2. According to such an exemplary implementation, the congestion field may serve as a key for selecting the redirection parameter from redirection table 500.

Referring back to FIG. 5 and environment 200, the selection of EARFCN information, PCI information, and priority information stored in redirection table 500, may be configured by network administrative personnel, etc. Additionally, although according to an exemplary implementation, the redirection parameter information is illustrated and described in relation to a table, the redirection parameter information may be implemented in other types of well-known data structures and/or a database.

EARFCN field 505 stores an EARFCN value. PCI field 510 stores a PCI value. Priority field 515 stores a priority value. A grouping of EARFCN, PCI, and priority is indicated as a record 520. In the case of multiple groupings, eNB 210 may select multiple records 520 to include as the redirection parameter or record 520 may include multiple groupings. According to an exemplary embodiment, redirection component 112 of network device 110 (e.g., a redirection component of eNB 210) is configured to provide an access class barring and redirecting service based on redirection table 500. For example, eNB 210 selects the redirection parameter from redirection table 500 when an access class barring condition for emergency calls is present. ENB 210 transmits the selected redirection parameter, along with other access class barring parameters, via a SIB Type 2 message.

Figure 3:
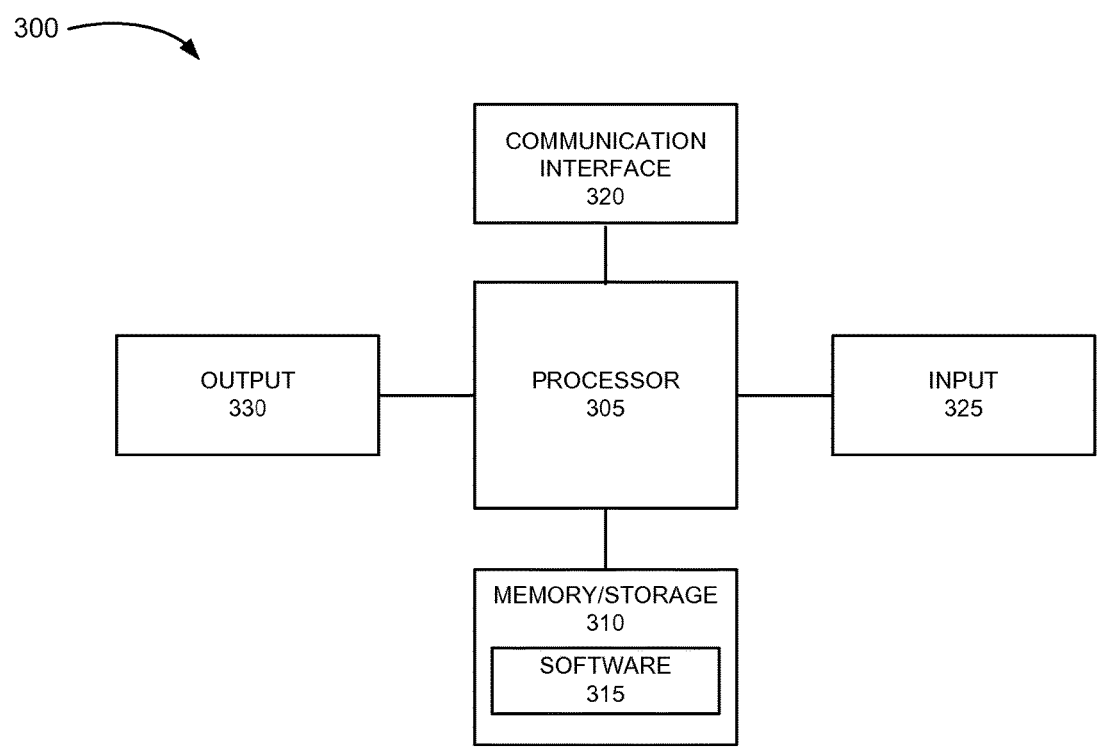
FIG. 3 is a diagram illustrating exemplary components of a device that may correspond to one or more of the devices in the exemplary environments illustrated in FIG. 1 and FIGS. 2A-2I.

FIG. 3 is a diagram illustrating exemplary components of a device 300 that may correspond to one or more of the devices in the environments described herein. For example, device 300 may correspond to network devices of wireless network 105 and wireless device 150. As illustrated, according to an exemplary embodiment, device 300 includes a processor 305, memory/storage 310 that stores software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., cache, etc.), etc.

Processor 305 may control the overall operation or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a computer program that provides a function and/or a process. Software 315 may include firmware. For example, with reference to wireless device 150, software 315 may include an application that, when executed by processor 305, provides the access class barring and redirecting service, as described herein. Additionally, for example, with reference to network device 110 (e.g., eNB 210, eNB 610, etc.), software 315 may include an application that, when executed by processor 305, provides an access class barring and redirecting service, as described herein. For example, eNB 210 may include an application, which when executed, provides a redirection parameter to wireless device 150 based on the redirection parameter information stored in redirection table 500.

Communication interface 320 permits device 300 to communicate with other devices, networks, systems, etc. Communication interface 320 may include one or multiple wireless interfaces and/or wired interfaces. Communication interface 320 may include one or multiple transmitters and receivers or transceivers. Communication interface 320 may include one or multiple antennas. Communication interface 320 may operate according to a protocol, layers (e.g., radio resource control (RRC), packet data convergence control (PDCP), non-access stratum (NAS), etc.) and a communication standard (e.g., LTE, etc.).

According to an exemplary implementation, with reference to wireless device 150, communication interface 320 comprises redirection component 152. According to an exemplary implementation, with reference to network device 110 (and implementations thereof (e.g., eNB 210, etc), communication interface 320 comprises redirection component 112. According to other exemplary implementations, redirection component 112 and/or redirection 152 may be included in other components of device 300.

Input 325 permits an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 permits an output from device 300. For example, output 330 may include a speaker, a display, a touchscreen, a touchless screen, a light, an output port, and/or some other type of visual, auditory, tactile, etc., output component.

Device 300 may perform a process and/or a function, as described herein, in response to processor 305 executing software 315 stored by memory/storage 310. By way of example, instructions may be read into memory/storage 310 from another memory/storage 310 (not shown) or read from another device (not shown) via communication interface 320. The instructions stored by memory/storage 310 may cause processor 305 to perform a process described herein. Alternatively, for example, according to other implementations, device 300 may perform a process described herein based on the operation of hardware (processor 305, etc.).

Figure 4A:
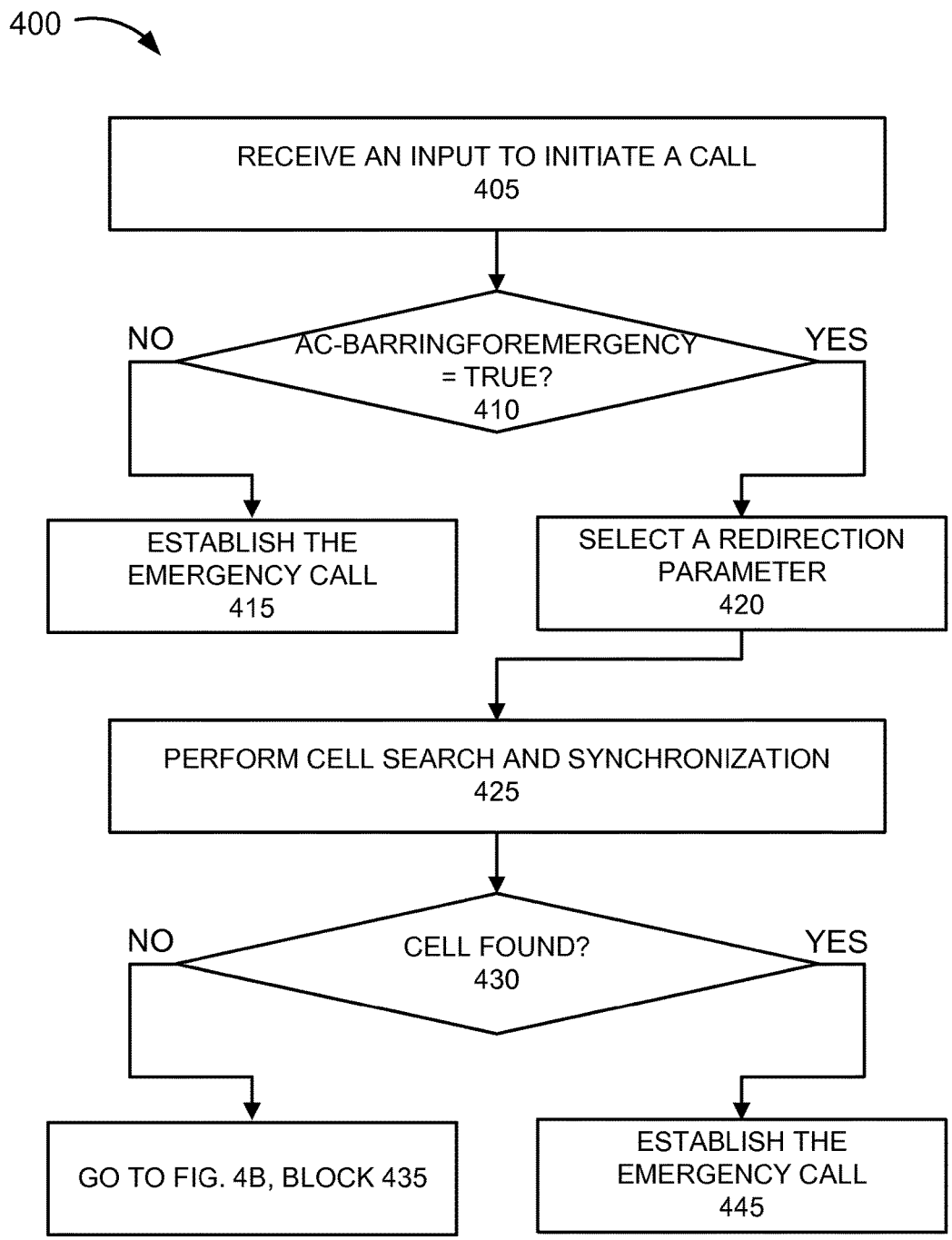
FIGS. 4A and 4B are flow diagrams that illustrate an exemplary process pertaining to access class barring and redirecting.
Figure 4B:
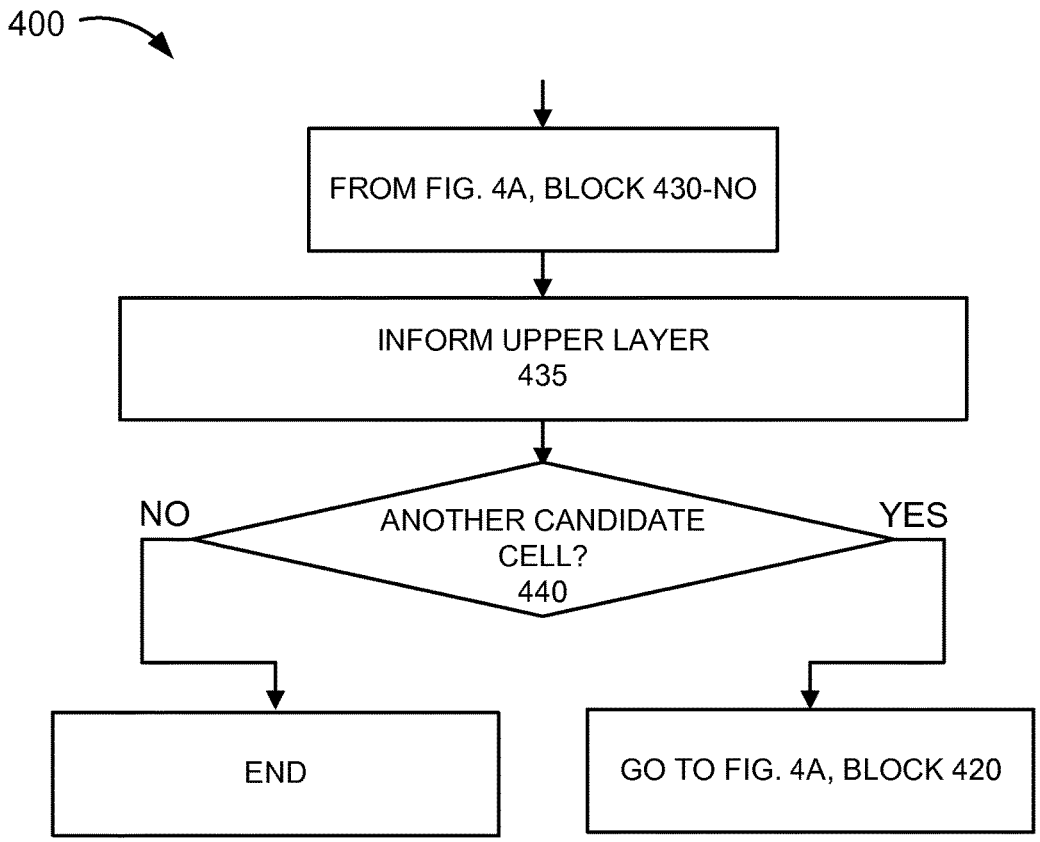

FIGS. 4A and 4B are flow diagrams that illustrate an exemplary process 400 pertaining to access class barring and redirecting. Process 400 is directed to a process previously described above with respect to FIGS. 2A-2I and elsewhere in this description, in which wireless device 150 may be redirected to one or multiple cells, based on a redirection parameter, when ac-barring for emergency calls is active in a cell. According to an exemplary embodiment, wireless device 150 performs the steps described in process 400. For example, processor 305 may execute software 315 to provide an access class barring and redirecting service. For purposes of description of process 400, assume that wireless device 150 is camped on a cell.

Referring to FIG. 4A, process 400 may begin, in block 405, with receiving an input to initiate an emergency call. For example, a user may initiate, via wireless device 150, an emergency call by dialing 911. Redirection component 152 of wireless device 150 may identify that an emergency call has been initiated.

In block 410, it is determined whether an emergency call is permitted in the current cell. For example, in the current cell, wireless device 150 receives a SIB Type 2 message that carries access class barring parameters. As previously described, according to an LTE specification, an ac-BarringForEmergency parameter may be set to True or False. Redirection component 152 determines the value of the first ac-BarringForEmergency parameter.

When it is determined that the emergency call is permitted with the current cell (block 410—NO), the wireless device establishes the call (block 415). For example, as previously described, when the first ac-BarringForEmergency parameter has a value of False, then wireless device 150 is not barred from establishing the emergency call in the current cell. Wireless device 150 establishes the emergency call based on LTE procedures. For example, depending on whether a packet data network (PDN) connection for emergency bearer service has already been established, wireless device 150 may or may not initiate a bearer setup procedure, etc. However, when wireless device 150 attaches normally (e.g., non-emergency) with wireless network 105, wireless device 150 may subsequently establish a new PDN connection with a request type set to emergency.

When it is determined that the emergency call is not permitted (block 410—YES), the wireless device selects a redirection parameter (block 420). For example, as previously described, when the first ac-BarringForEmergency parameter has a value of True, wireless device 150 is barred from establishing the emergency call in the current cell.

Redirection component 152 reads the access class barring information. Redirection component 152 selects one or multiple attributes and value(s) pertaining to a candidate cell. Depending on the number of candidate cell attributes, as well as if the redirection parameter includes priority information, redirection component 152 selects the appropriate attribute from the access class barring information. For example, as previously described, the redirection parameter may include one attribute (e.g., EARFCN, PCI, etc.), multiple attributes (e.g., EARFCN and PCI, etc.), a list of single attributes with priority flags (e.g., EARFCN with a priority flag, another EARFCN with another priority flag, etc.), or a list of multiple attributes with priority flags (e.g., EARFCN and PCI with a priority flag, another EARFCN and PCI with another priority flag, etc.). Redirection component 152 may calculate the carrier frequency based on the EARFCN for the downlink or the downlink and the uplink. Alternatively, another type of identifier may indicate a carrier frequency, as previously described. Additionally, according to other embodiments, a component other than redirection component 152 may calculate the carrier frequency based on the EARFCN.

In block 425, a cell search and synchronization procedure is performed. For example, wireless device 150 performs the cell search and synchronization procedure based on the redirection parameter. For example, wireless device 150 tunes to a particular carrier frequency based on the redirection parameter. Additionally, wireless device 150 may determine whether other parameters (e.g., a cell identifier, a device identifier, etc.) match the attribute of the candidate cell set forth in the redirection parameter based on information received from the prospective new cell.

In block 430, it is determined whether a new cell is found. For example, redirection component 152 of wireless device 150 determines whether a new cell is found. As described above, during the cell search and synchronization procedure, wireless device 150 may determine whether the redirection parameter matches the attributes of the prospective new cell. Additionally, redirection component 152 also determines the value of the first ac-BarringForEmergency parameter. When the value is True, redirection component 152 determines that a new cell is not found, and when the value is False, redirection component 152 determines that a new cell is found.

Referring to FIG. 4B, when it is determined that a new cell is not found (block 430—NO), the upper layer is informed (block 435). For example, an RRC layer of wireless device 150 informs the NAS layer about the failure of the RRC procedure and/or that the cell is barred.

In block 440, it is determined whether another candidate cell is specified in the redirection parameter. For example, redirection component 152 determines whether another attribute or attributes exist for another candidate cell based on the redirection parameter information stored by wireless device 150.

When it is determined that there is not another candidate cell (block 440—NO), process 400 may end. For example, wireless device 150 may perform a cell-reselection procedure according to an LTE specification without using a redirection parameter. Alternatively, for example, wireless device 150 may perform a silent redial procedure via a different radio access technology (RAT). When it is determined that there is another candidate cell (block 440—YES), then process 400 continues to block 420 of FIG. 4A. For example, redirection parameter 152 selects the attribute and the value belonging to the other candidate cell, as set forth in the redirection parameter.

Referring back to FIG. 4A, when it is determined that a new cell is found (block 430—YES), then the call is established in the new cell (block 445). For example, wireless device 150 performs a radio resource control (RRC) procedure to establish an emergency PDN connection. For example, wireless device 150 generates and transmits an RRC connection request that includes the establishment cause set to emergency. The emergency call is placed via the emergency PDN connection.

Although FIGS. 4A and 4B illustrate an exemplary process pertaining to access class barring and redirecting, according to other embodiments, process 400 may include additional operations, fewer operations, and/or different operations than those illustrated in FIGS. 4A and 4B, and as described herein.

Figure 7:
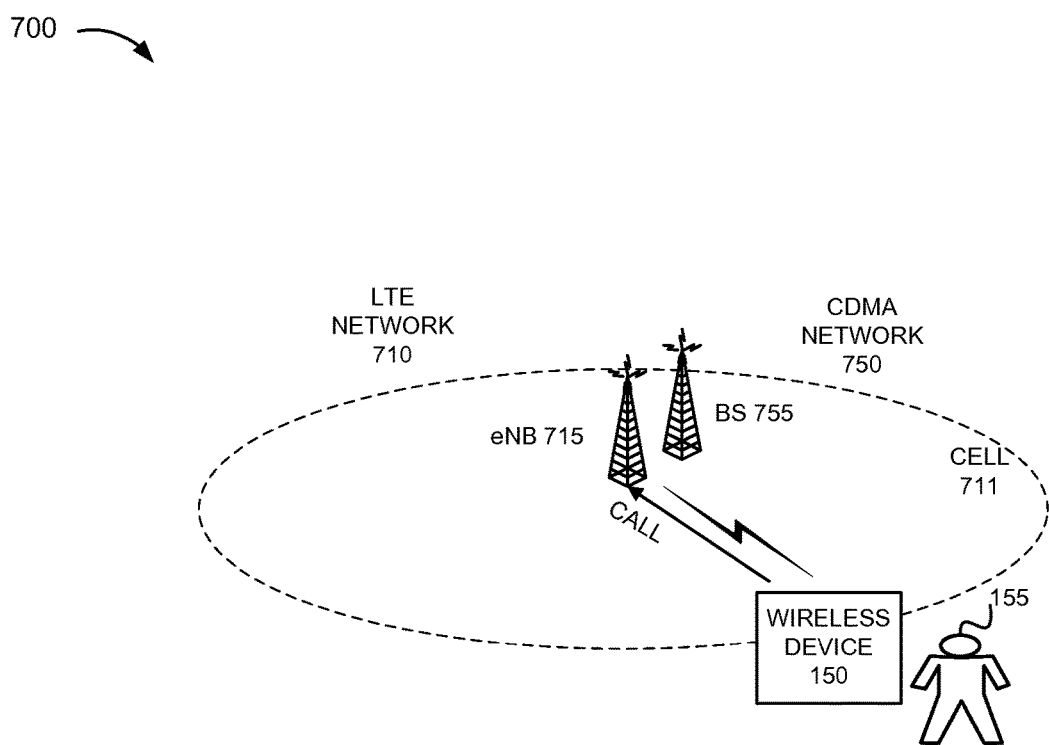
FIG. 7 is a diagram illustrating still another exemplary environment in which exemplary embodiments of access class barring and redirecting may be implemented.

The foregoing description of embodiments provides illustration, but is not intended to be exhaustive or to limit the embodiments to the precise form disclosed. The specification and drawings are accordingly to be regarded as illustrative rather than restrictive. Various modifications and changes may be made thereto, and additional embodiments may be implemented, without departing from the broader scope of the invention as set forth in the claims that follow. For example, the redirection parameter may include attributes and values pertaining to a cell of to another wireless access technology (e.g., radio access technology (RAT)). For example, the attributes may be similar to those previously described, such as a carrier frequency, a channel number, a cell identifier, a wireless node identifier, etc. By way of example, referring to FIG. 7, an exemplary environment 700 includes an LTE network 710 and a CDMA network 750. LTE network 710 includes an eNB 715 and CDMA network 750 includes a base station (BS) 755. A cell 711 indicates a geographic area serviced by eNB 715 and BS 755. As illustrated, eNB 715 and BS 755 resides within cell 711. In this regard, eNB 715 and BS 755 may be considered co-located. ENB 715 stores redirection table 500 that includes redirection parameter information pertaining to the LTE network 710 and CDMA network 750. Thus, when wireless device 150 is able to communicate via multiple, wireless access technologies, wireless device 150 may use the redirection parameter to locate a suitable cell for placing the emergency call. By way of further example, the redirection parameter may be implemented as follows:

ac-BarringInfo ac-BarringForEmergency TRUE ac-BarringForEmergency EARFCN-PCI 5230 4 1 ac-BarringForEmergencyCDMA BAND-CH 1900 50 2   (7)

in which, as illustrated in example (7) above, the attributes and values pertaining to the CDMA network (e.g., BS 755) are listed as a third parameter. According to this example, the attribute name indicates the RAT (e.g., CDMA). According to other examples, the naming of the RAT may be omitted. According to this example, the candidate cell is the same cell. Additionally, the attributes associated with the CDMA network include band (BAND) (e.g., downlink), which has a value of 1900, and the channel number (CH), which has a value of 50, along with a priority flag having a value of 2.

According to another modification, the redirection parameter information includes a timeout value. For example, the timeout value could indicate a time period and/or a number of failed attempts to camp on a cell and establish the emergency call, which when satisfied, causes wireless device 150 to switch to redirection parameter information pertaining to another RAT. Redirection component 152 may include a counter mechanism that keeps track of the time period and/or number of failed attempts. By way of further example, the redirection parameter may be implemented as follows:

ac-BarringInfo ac-BarringForEmergency TRUE ac-BarringForEmergency EARFCN-PCI-TO 5230 4 20 ac-BarringForEmergency BAND-CH 1900 50   (8)

in which, as illustrated in example (8) above, the attributes and values pertaining to the CDMA network (e.g., BS 755) are listed as a third parameter. In this example, CDMA is not specified in the attribute name and, in contrast to example (7), priority flag values have been omitted. Additionally, referring to the second parameter, there is a new attribute TO, which indicates a timeout period. The TO has a value of 20, which represents a number of seconds. The number and the time unit are purely exemplary. Thus, referring to FIG. 7, redirection component 152 of wireless device 150 may attempt to establish an emergency call via eNB 715. The timeout period would allot redirection component 152 twenty seconds to establish the emergency call. Upon expiration of the twenty seconds, when unsuccessful due to access class barring conditions, wireless device 150 may then attempt to establish the emergency call via BS 755 in accordance with the attributes and values set forth in the third parameter pertaining to CDMA network 750.

According to still another example, the redirection parameter may be implemented as follows:

ac-BarringInfo ac-BarringForEmergency TRUE ac-BarringForEmergency TIMER 40 ac-BarringForEmergency EARFCN-PCI 5230 4 1; 1350 23 2 ac-BarringForEmergencyCDMA BAND-CH 1900 50    (9)

in which, as illustrated in example (9) above, the TIMER attribute (in a separate line at the top), which has a value of 40, indicates a timeout period for the list of the two groupings (see example (6) above) and the CDMA network 750. According to this example, redirection parameter 152 of wireless device 150 is allotted forty seconds to establish the emergency call. If unsuccessful, upon expiry of the timeout period, redirection component 152 may select or fall back to any wireless network available to establish the emergency call.

According to yet another modification, the access class barring may not be driven by congestion control. For example, according to an exemplary embodiment, the access class barring, as described herein, is an operator controlled Operations and Maintenance (O&M) access class barring in which the access barring is always used to control a user device and not driven by congestion control, load, etc. of the wireless network.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 4A and 4B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 305, etc.), or a combination of hardware and software (e.g., software 315). The embodiments have been described without reference to the specific software code since the software code can be designed to implement the embodiments based on the description herein and commercially available software design environments/languages.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 310.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, but are used merely as labels to distinguish one claim element having a certain name from another element having a same name (but for use of the ordinal term) to distinguish the claim elements.

No element, act, or instruction described in the present application should be construed as critical or essential to the embodiments described herein unless explicitly described as such.

What is claimed is:

1. A method comprising:

camping, by a wireless device, on a current cell of a base station of a wireless network, wherein the wireless network is a Long Term Evolution network;

receiving, by the wireless device and from the base station, access class barring information including a first barring parameter and a second barring parameter pertaining to the current cell via a system information block type 2 message;

storing, by the wireless device, the first barring parameter and the second barring parameter;

receiving, by the wireless device and subsequent to the storing, an input to initiate an emergency call;

determining, by the wireless device and in response to the input, whether the emergency call can be established via the current cell based on a value of the first barring parameter;

selecting, by the wireless device, one or more values of the second barring parameter in response to determining that the value of the first barring parameter indicates that the emergency call cannot be established via the current cell, wherein the one or more values of the second barring parameter include an Evolved Absolute Radio Frequency Channel Number value pertaining to a first candidate cell;

cell searching and synchronizing, by the wireless device, for the first candidate cell based on the one or more values of the second barring parameter, wherein the current cell and the first candidate cell are serviced by a same evolved Node B corresponding to the base station;

receiving, by the wireless device, based on the cell searching and synchronizing, system information from the first candidate cell, wherein the system information includes a first barring parameter pertaining to the first candidate cell;

determining, by the wireless device, whether the emergency call can be established via the first candidate cell based on the one or more values of the second barring parameter and the system information;

establishing, by the wireless device, the emergency call via the first candidate cell based on determining that the emergency call can be established via the first candidate cell;

determining, by the wireless device, whether another one or more values of the second barring parameter are stored based on determining that the emergency call cannot be established via the first candidate cell;

selecting, by the wireless device, the other one or more values of the second barring parameter based on determining that the other one or more values of the second barring parameter are stored; and cell searching and synchronizing, by the wireless device, for a second candidate cell based on the other one or more values of the second barring parameter.

2. The method of claim 1, wherein the

Evolved Absolute Radio Frequency Channel Number value indicates a downlink carrier frequency and an uplink carrier frequency pertaining to the first candidate cell.

3. The method of claim 1, wherein the second candidate cell is serviced by another base station.

4. The method of claim 1, wherein the determining whether the emergency call can be established via the first candidate cell comprises:

comparing, by the wireless device, the one or more values of the second barring parameter to one or more parameter values of the first barring parameter included in the system information; and determining, by the wireless device, whether the one or more values of the second barring parameter match the one or more parameter values of the first barring parameter included in the system information, based on the comparing.

5. The method of claim 1, wherein the one or more values of the second barring parameter include a physical cell identifier value pertaining to the first candidate cell.

6. The method of claim 1, wherein the one or more values of the second barring parameter include a timeout value.

7. The method of claim 1, wherein the one or more values of the second barring parameter include a listing of groups, wherein a first group of the groups comprises a priority flag and, the Evolved Absolute Radio Frequency Channel Number (EARFCN) value pertaining to the first candidate cell or the EARFCN value and a physical cell identifier value pertaining to the first candidate cell, wherein a value of the priority flag indicates a priority level relative to other groups of the groups.

8. The method of claim 1, wherein the one or more values of the second barring parameter comprises one or more values applicable to a radio access technology of the wireless network and one or more values applicable to a radio access technology that is different from the radio access technology of the wireless network, and wherein the method further comprises:

storing, by the base station of the wireless network that services the current cell, the second barring parameter; and transmitting, by the base station, to the wireless device, the first barring parameter and the second barring parameter.

9. A wireless device comprising:
a communication interface;
a memory, wherein the memory stores instructions; and
a processor, wherein the processor is configured to execute the instructions to:

camp on a current cell of a base station of a wireless network;

receive, via the communication interface and from the base station, a first barring parameter and a second barring parameter pertaining to emergency calls via the current cell;

store the first barring parameter and the second barring parameter in response to the receipt of the first barring parameter and the second barring parameter;

receive an input to initiate an emergency call subsequent to the storing of the first barring parameter and the second barring parameter;

determine, in response to the receipt of the input, whether the emergency call can be established via the current cell of the base station based on a value of the first barring parameter;

select one or more values of the second barring parameter in response to a determination that the value of the first barring parameter indicates that the emergency call cannot be established via the current cell;

cell search and synchronize, via the communication interface, for a first candidate cell based on the one or more values of the second barring parameter;

receive, via the communication interface, based on the cell search and synchronization, system information from the first candidate cell, wherein the system information includes a first barring parameter pertaining to the first candidate cell, and wherein the system information from the first candidate cell includes another first barring parameter and another second barring parameter;

determine whether the emergency call can be established via the first candidate cell based on the one or more values of the second barring parameter and the system information;

establish, via the communication interface, the emergency call via the first candidate cell based on determining that the emergency call can be established via the first candidate cell;

omit to establish, via the communication interface, the emergency call via the first candidate cell based on a determination that the emergency call cannot be established via the first candidate cell; and sort remaining one or more values of the second barring parameter with one or more values of the other second barring parameter.

10. The wireless device of claim 9, wherein when determining whether the emergency call can be established via the first candidate cell, the processor is further configured to execute the instructions to:

compare the one or more values of the second barring parameter to one or more parameter values included in the system information; and determine whether the one or more values of the second barring parameter match the one or more parameter values included in the system information, based on the comparison.

11. The wireless device of claim 9, wherein the wireless network is a Long Term Evolution network, and the wireless device is a mobile device.

12. The wireless device of claim 9, wherein the one or more values of the second barring parameter include a listing of groups, wherein a first group of the groups comprises one or more attributes and one or more attribute values pertaining to a first radio access technology, and wherein a second group of the groups comprises one or more attributes and one or more attribute values pertaining to a second radio access technology, wherein the first radio access technology is different from the second radio access technology.

13. The wireless device of claim 9, wherein the processor is further configured to execute the instructions to:
   establish, via the communication interface, the emergency call via a second candidate cell based on the sort of the remaining one or more values of the second barring parameter with the one or more values of the other second barring parameter.

14. The wireless device of claim 9, wherein the processor is further configured to execute the instructions to:
   determine whether another one or more values of the second barring parameter are stored based on a determination that the emergency call cannot be established via the first candidate cell;
   select the other one or more values of the second barring parameter based on the determination that the other one or more values of the second barring parameter are stored; and
   cell search and synchronize for a second candidate cell based on the other one or more values of the second barring parameter.

15. The wireless device of claim 9, wherein the one or more values of the second barring parameter include an Evolved Absolute Radio Frequency Channel Number value, and wherein the processor is further configured to execute the instructions to:
   calculate a carrier frequency based on the Evolved Absolute Radio Frequency Channel Number value, and wherein when cell searching and synchronizing for the first candidate cell, the processor further executes the instructions to:
   use the carrier frequency to cell search and synchronize for the first candidate cell.

16. A non-transitory storage medium that stores instructions executable by a processor of a computational device to:
   receive, from a base station servicing a cell, a first access class barring parameter and a second access class barring parameter pertaining to emergency calls;
   store the first access class barring parameter and the second access class barring parameter in response to the receipt of the first access class barring parameter and the second access class barring parameter;
   receive an indication that an emergency call is to be established subsequent to the storage of the first access class barring parameter and the second access class barring parameter;
   determine, in response to the receipt of the indication, whether the emergency call can be established via the cell based on a value of the first access class barring parameter;
   select one or more values of the second access barring parameter in response to a determination that the value of the first access barring parameter indicates that the emergency call cannot be established via the cell of the base station;
   cell search and synchronize to a first candidate cell based on the one or more values of the second access barring parameter;
   receive, based on the cell search and synchronization, system information from the first candidate cell, wherein the system information includes a first barring parameter pertaining to the first candidate cell;
   determine whether the emergency call can be established via the first candidate cell based on the one or more values of the second access barring parameter and the system information pertaining to the first candidate cell;
   establish the emergency call via the first candidate cell based on a determination that the emergency call can be established via the first candidate cell;
   determine whether another one or more values of the second access barring parameter are stored based on a determination that the emergency call cannot be established via the first candidate cell;
   select the other one or more values of the second access barring parameter based on the determination that the other one or more values of the second access parameter are stored; and
   cell search and synchronize for a second candidate cell based on the other one or more values of the second access barring parameter.

17. The non-transitory storage medium of claim 16, further storing instructions executable by the processor of the computational device to:
   compare the one or more values of the second access barring parameter to one or more parameter values included in the system information; and
   determine whether the one or more values of the second access barring parameter match the one or more parameter values included in the system information, based on the comparison.

18. The non-transitory storage medium of claim 16, wherein the cell is a cell of a Long Term Evolution network, and wherein the first access barring parameter and the second access barring parameter pertaining to the cell of the Long Term Evolution network are included in a system information block type 2 message of the cell and the one or more values of the second access barring parameter include an Evolved Absolute Radio Frequency Channel Number value pertaining to the first candidate cell.

19. The non-transitory storage medium of claim 16, wherein the instructions for determining further store instructions executable by the processor of the computational device to:
   determine whether the emergency call can be established via the first candidate cell based on a value of the first access barring parameter received from the first candidate cell.

20. The non-transitory storage medium of claim 16, wherein the one or more values of the second access barring parameter include a physical cell identifier value pertaining to the first candidate cell.

* * * * *